United States Patent [19]

Zaltzman

[11] Patent Number: 5,118,409
[45] Date of Patent: Jun. 2, 1992

[54] APPARATUS AND METHOD FOR IMPROVING DENSITY UNIFORMITY OF A FLUIDIZED BED MEDIUM, AND/OR FOR IMPROVING MATERIAL FLUIDIZED BED SORTING

[75] Inventor: Arthur Zaltzman, Pocatello, Id.

[73] Assignee: SDDM, Inc., Pocatello, Id.

[21] Appl. No.: 571,136

[22] Filed: Aug. 21, 1990

Related U.S. Application Data

[63] Continuation-in-part of Ser. No. 373,067, Jun. 28, 1989, Pat. No. 5,048,693.

[51] Int. Cl.⁵ .................................................. B03B 5/46
[52] U.S. Cl. ..................................... 209/466; 209/486; 209/488; 209/504
[58] Field of Search ............................ 209/466–469, 209/471, 486, 488, 503, 504, 508

[56] References Cited

U.S. PATENT DOCUMENTS

| | | | |
|---|---|---|---|
| 1,068,163 | 7/1913 | Payne | 209/486 |
| 1,178,238 | 4/1916 | Keller | |
| 1,634,898 | 7/1927 | Delamater | 209/476 |
| 1,801,195 | 4/1931 | Fraser | 209/474 |
| 1,837,299 | 12/1931 | Taggart | 209/485 |
| 1,980,490 | 11/1934 | Lide | 209/467 X |
| 2,006,119 | 6/1935 | Steinmetzer | 209/466 |
| 2,006,126 | 6/1935 | Berry | 209/467 |
| 2,007,190 | 7/1935 | Fraser | 209/474 |

(List continued on next page.)

FOREIGN PATENT DOCUMENTS

| | | | |
|---|---|---|---|
| 0070802 | 5/1942 | Czechoslovakia | 209/468 |
| 565956 | 12/1932 | Fed. Rep. of Germany | 209/474 |
| 2848474 | 5/1979 | Fed. Rep. of Germany | 209/474 |
| 120697 | 8/1959 | U.S.S.R. | 209/474 |
| 946480 | 1/1964 | United Kingdom | |
| 1152611 | 5/1969 | United Kingdom | |
| 1153722 | 5/1969 | United Kingdom | |
| 1178235 | 1/1970 | United Kingdom | |
| 2059810 | 4/1981 | United Kingdom | 209/466 |
| 2078522 | 1/1982 | United Kingdom | |

OTHER PUBLICATIONS

Zaltzman, A., et al., "Separating Potatoes from Clods and Stones in a Fluidized Bed Medium," *Transactions of the ASAE*, vol. 26, No. 4, pp. 987–990 and 995 (1983).

Clarke, B., "Cleaning Seeds by Fluidization," *Journal of Agricultural Engineering Research* 31, pp. 231–242 (1985).

Zaltzman, A., et al., "Analytical Model of a Gravitational Separation Process in a Fluidized Bed Medium," *Journal of Agricultural Engineering Research* 34, pp. 257–273 (1986).

A. Zaltzman, et al., *Potential of Quality Sorting of Fruits and Vegetables Using Fluidized Bed Medium*, American Society of Agricultural Engineers, vol. 30(3):May–Jun., 1987, pp. 823–831.

Primary Examiner—Kevin P. Shaver
Assistant Examiner—Edward M. Wacyra
Attorney, Agent, or Firm—Workman, Nydegger & Jensen

[57] ABSTRACT

An apparatus for providing a fluidized bed to effect the separation of a mixture of articles having at least a first density and a second density that is greater than the first density into separate groups. The apparatus includes an inclined trough which is supplied at an input end with either a fluidization medium, such as sand, or a mixture of articles from which a fluidized bed is formed by forcing gas upwardly through the bottom of the trough and through the fluidization medium or the mixture. In the case where a fluidization medium such as sand is used, the mixture of articles is introduced into the fluidized bed medium so as to be entrained therewith to effect separation as the articles travel in the direction of flow of the fluidized bed medium. Vertical oscillatory movement is imparted to the inclined trough to improve the separation and layering where the mixture of articles is fluidized, or to improve the density uniformity where a fluidization medium such as sand is fluidized as the bed.

50 Claims, 7 Drawing Sheets

U.S. PATENT DOCUMENTS

| | | | |
|---|---|---|---|
| 2,093,470 | 9/1937 | Morgan | 209/474 |
| 2,101,295 | 12/1937 | Rusk | 209/466 |
| 2,154,784 | 4/1939 | Stump | 209/486 |
| 2,258,789 | 10/1941 | Morgan | 209/504 X |
| 2,303,367 | 12/1942 | Kendall et al. | 209/44 |
| 2,525,390 | 10/1950 | Baroody | 209/466 X |
| 3,031,081 | 4/1962 | Belk | 209/173 |
| 3,349,912 | 10/1967 | Eveson et al. | 209/474 |
| 3,367,501 | 2/1968 | Eveson | 209/467 |
| 3,430,764 | 3/1969 | Hensley | 209/10 |
| 3,567,017 | 3/1971 | Hughes et al. | 209/156 |
| 3,674,144 | 7/1972 | Muller et al. | 209/468 |
| 3,702,656 | 11/1972 | Gutterman et al. | 209/156 |
| 3,773,175 | 11/1973 | Wallace | 209/173 |
| 3,834,927 | 9/1974 | Putney | 117/21 |
| 3,842,978 | 10/1974 | Summers | 209/469 |
| 4,984,306 | 10/1976 | Sayles et al. | 209/20 |
| 4,035,288 | 7/1977 | Gibert et al. | 209/466 |
| 4,071,304 | 1/1978 | Chauvin et al. | 427/185 |
| 4,082,655 | 4/1978 | Toledo | 209/173 |
| 4,225,424 | 9/1980 | Patzlaff | 209/3.1 |
| 4,322,287 | 3/1982 | Zaltzman | 209/44 |
| 4,375,264 | 3/1983 | Porter | 209/606 |
| 4,466,542 | 8/1984 | Oetiker et al. | 209/44.2 |
| 4,741,443 | 5/1988 | Hanrot et al. | 209/44.1 |
| 4,861,464 | 8/1989 | Zaltzman et al. | 209/474 |
| 4,865,722 | 9/1989 | Ririe et al. | 209/474 |

1

APPARATUS AND METHOD FOR IMPROVING DENSITY UNIFORMITY OF A FLUIDIZED BED MEDIUM, AND/OR FOR IMPROVING MATERIAL FLUIDIZED BED SORTING

This application is a continuation-in-part of U.S. patent application Ser. No. 07/373,067, filed Jun. 28, 1989, now U.S. Pat. No. 5,048,693.

BACKGROUND OF THE INVENTION

1. Field of the Invention

The present invention relates to methods and apparatus using fluidized bed principles for separating mixtures of articles of different densities, and more particularly to such methods and apparatus as are applicable to the sorting of articles such as, for example, agricultural or other products having small density differences into several density groups.

2. Background Art

The use of density variation as a means of separating mixtures of articles is widespread. In agriculture, the separation and sorting of produce on this basis is accomplished using both wet and dry methods.

Wet methods use a liquid as a medium with which to separate denser articles, which sink in the given liquid, from the lighter ones that will float thereupon. Dry methods of sorting employ a form of pneumatic separation based on a combination of differing densities and differing aerodynamic properties associated with the components to be sorted.

In one type of dry method (termed material fluidized bed or "FB" method), a gas, such as air, is forced upwardly through a moving bed of the mixture to be separated. This gas flow through the interstices of the particles of the mixture tends to disengage the particles from each other, permitting the gas flow to support at least some of the weight thereof. As a result, the bed of the mixture resembles a liquid of high viscosity, and the particles of the mixture are freed to a degree to migrate within the bed under the influence of physical forces such as gravity that might tend to induce separation among the constituent components.

The separation that occurs when a mixture to be separated is itself fluidized is not one that results exclusively due to differing density among the components of the mixture. Instead, the aerodynamic properties of the particles of the mixture also have a substantial impact upon the rate and quality of the separation that results. The upward flow of gas through the mixture will tend to draw with it the less compact particles of the mixture, regardless of their density.

Separators which pneumatically fluidize the actual mixture to be separated have limited separation effectiveness. While the upper and lower layers of the stratified mixture discharged from the end of the separator trough may be relatively pure, the layers intermediate thereto continue to comprise a mixture of particles of both densities. This precludes the achievement of optimal separation effectiveness.

A second, more profound drawback of FB separation methods in which the mixture to be separated is itself pneumatically fluidized arises because previously fluidization of the mixture has not been practical if the particles of the mixture have diameters greater than approximately one or two millimeters. Thus, such methods have been effective only in separating small products, such as grain cereal, and have not been used to separate or sort larger products.

Accordingly, resort has been made to a second type of dry method (termed a fluidized bed medium or "FBM" method) which is based on the use of fluidized beds which are constituted of a material other than the mixture to be separated. For the purpose of separating mixtures of larger solid bodies of differing densities, a fluidized bed created from such a fluidization medium behaves in a manner analogous to a liquid, but without wetting the articles of the mixture it is used to separate. Pieces of solid material less dense than the apparent density of the fluidized bed will act as a "float fraction" which will float on the surface of the bed. Pieces of solid material which are more dense than the apparent density of the fluidized bed will, on the other hand, act as a "sink fraction" of the mixture which will sink to the bottom of the bed.

For separation to occur, the apparent density of the fluidized bed must be maintained so that it is intermediate the densities of the float and sink fractions of the mixture. Additionally, the particle size of the fluidization medium must be smaller by several orders of magnitude than the size of the bodies contained in the mixture that is to be separated.

Prior to this invention, the use of a fluidization medium other than the mixture to be separated was advantageously used to reduce the influence on the process of other separation factors, such as aerodynamic characteristics, and reduced the process to one in which separation was accomplished substantially on the basis of differing density only. In addition, the presence of a layer of fluidization medium intermediate the float fraction of the mixture on top of the fluidized bed and the sink fraction of the mixture at the bottom thereof permitted a better separation of the float and sink fractions. This was accomplished by separating the upper portion of the fluidized bed with the float fraction entrained therein from the lower portion thereof having the sink fraction entrained therein. Thereafter the two components were cleaned independently to remove any fluidization medium, and close to one hundred percent separation effectiveness between the float and sink fractions of the mixture can be achieved.

While this type of dry method works well for many applications, it still has some limitations. For example, most of the available methods, except a few wet methods, are aimed at separating products with large differences in density (such as clods and stones from potatoes, or plastic particles from copper particles, etc.). Meanwhile, a large variety of sorting applications for various types of products exists wherein the products to be sorted have only small differences in density. Mixtures of such products are commonly found, for example, in agriculture.

Most agricultural products such as fruits and vegetables do not have uniform quality and they do not uniformly mature. Postharvest quality sorting is thus required to supply reliable and uniform quality in the market place.

Some of the used techniques for quality sorting are specific to the kinds of produce for which they were developed. In addition, there are no viable methods for sorting numerous other products.

Density may be the most direct and consistent index of maturity and other quality changes. When quality changes are not manifest in external changes, such as differences in size, weight, color, etc., quality sorting with current technology is ineffective. Density may be the sole criterion to permit opportunities for quality sorting in such circumstances. However, quality sorting based on density differences has found limited success in commercial applications for several reasons.

Density changes due to quality transformations in agricultural commodities usually are very small (typically in the range of 0.02-0.04 g/cm$^3$). Effectively detecting and sorting products having these small density differences appears to be possible only in a highly controlled density sorting process. Current density sorting techniques which use liquids such as brine solutions or solution of alcohol in water to sort sink and float fractions require very close control of the density of such solutions so as to maintain the density intermediate that of the sink and float fractions. This is difficult, particularly as such solutions tend to become contaminated with foreign materials, which affects the solution's density. Thus, frequent changing of the solution may be required, as is preconditioning and post washing operations to reduce contamination and also to remove such liquids from the produce. These operations often deteriorate product quality and storageability. Furthermore, such liquids are expensive, and they may present fire and social hazards when used in large quantities. Some commodities such as peas and blueberries need preliminary prewetting to remove air bubbles. Others, such as peanuts, walnuts, and pecans generally can't be processed in liquids because the absorption of the liquids adversely change mealiness properties. Furthermore, sorting frequently requires grading into three or more categories, which in turn may require several liquid changes.

On the other hand, dry methods of the type noted above are generally limited to sorting mixtures of products wherein there are relatively large density differences between the float and sink fractions. When differences in densities of the products to be sorted are small, such as in the range of differences on the order of 0.02 g/cm$^3$, the density of the fluidized bed, which as noted must be intermediate the sink and float fractions, should differ by only 0.01 g/cm$^3$ from the densities of the products. Maintaining a fluidized bed within such parameters is technically difficult to achieve. Accordingly, what is needed is a method and apparatus for improving the density uniformity of fluidized bed medium (FBM) sorting techniques, and for improving material fluidized bed (FB) sorting techniques, and which eliminates many of the above-noted difficulties. Such an apparatus and method are described and claimed herein.

SUMMARY AND OBJECTS OF THE INVENTION

In view of the present state of the art, one object of the present invention is to provide an improved method and apparatus for efficiently separating and sorting a mixture of articles, as for example agricultural products, when the articles are to be sorted into several different groups based on small density differences.

Another object of the invention is to provide an improved method and apparatus for sorting articles of small density differences into several groups utilizing an improved FB or FBM process.

A further object is to provide a method and apparatus wherein the density uniformity of a fluidized bed medium is improved so as to permit improved separation of a mixture of articles having small density differences which are entrained in the fluidized bed to form sink and/or float fractions.

Still another object of the present invention is to provide a method and apparatus for improving separation of articles with small density differences into several groups utilizing a fluidized bed formed from a mixture of the articles to be separated, and wherein the size of the articles may be significantly larger than 1-2 mm, such as peanuts, beans or corn.

The foregoing and other objects and advantages of the invention will become more apparent from the following detailed description, or may be learned by the practice of the invention.

In accordance with the invention as embodied and broadly described herein, in one presently preferred embodiment a mixture comprised of articles having small density differences is supplied to an inclined trough at an input end of the trough. A fluidizing gas such as air is forced from the bottom of the trough through the mixture of articles so as to create therefrom a material fluidized bed which flows through the inclined trough under the influence of gravity to an output end of the trough. Preferably the trough is wider and more shallow at the input end thereof and becomes narrower and more deep at the output end. A vertical oscillation is imparted to the trough which advantageously increases the effective separation of the various components of the mixture while the mixture is moving in the direction of the fluidized bed flow. Less dense components of the mixture rise to the surface of the fluidized bed whereas the more dense components form one or more layers beneath the least dense components, forming a layered effect as the fluidized bed becomes deeper toward the output end of the inclined trough. At the output end of the trough the various layers are separated one from the other, for example by a stream splitter, and are loaded onto different conveyors.

In another embodiment of the invention, one or more of the layers may be conveyed to one or more similar inclined troughs where further separation of the conveyed portion or layers occurs by further fluidization of that portion of the mixture.

In yet a further embodiment of the apparatus and method of the present invention, the fluidized bed is formed from a medium such as sand and the mixture of articles which is to be separated based on small density differences into various density groups is introduced into the input end of the trough so that the mixture of articles is entrained in the fluidized bed medium. As in the case of the previous embodiment, a vertical oscillation is imparted to the inclined trough which advantageously improves the density uniformity of the fluidized bed medium so as to more effectively maintain the fluidized bed medium at a density which is intermediate the least and most dense articles of the mixture which are to be separated.

In still a further embodiment of the apparatus and method of the present invention, the mixture of articles which is to be separated based on small density differences may be introduced into the fluidized bed medium at a selected depth and permitted to ascend so that the articles of differing densities will become spatially separated as they become entrained and travel in the direction of the flow of the fluidized bed while ascending to the top thereof. Articles having less density will ascend faster whereas articles having increased density will ascend more slowly thus tending to affect the spatial separation at the surface. As in the case of the other embodiments, vertical oscillation is preferably imparted to the trough so as to improve the density uniformity of the fluidized bed.

BRIEF DESCRIPTION OF THE DRAWINGS

A more particular description of the invention briefly summarized above will be rendered by reference to the specific embodiments thereof which are illustrated in the appended drawings, in which like parts are designated by like numerals. Understanding that these drawings depict only typical embodiments of the invention as represented, for example, by the currently understood best mode for practicing the invention, the drawings are therefore not to be considered limiting of its scope. The invention will thus be described with additional specificity and detail through the use of the following drawings in which.

DESCRIPTION OF THE PREFERRED EMBODIMENTS

Figure 1:
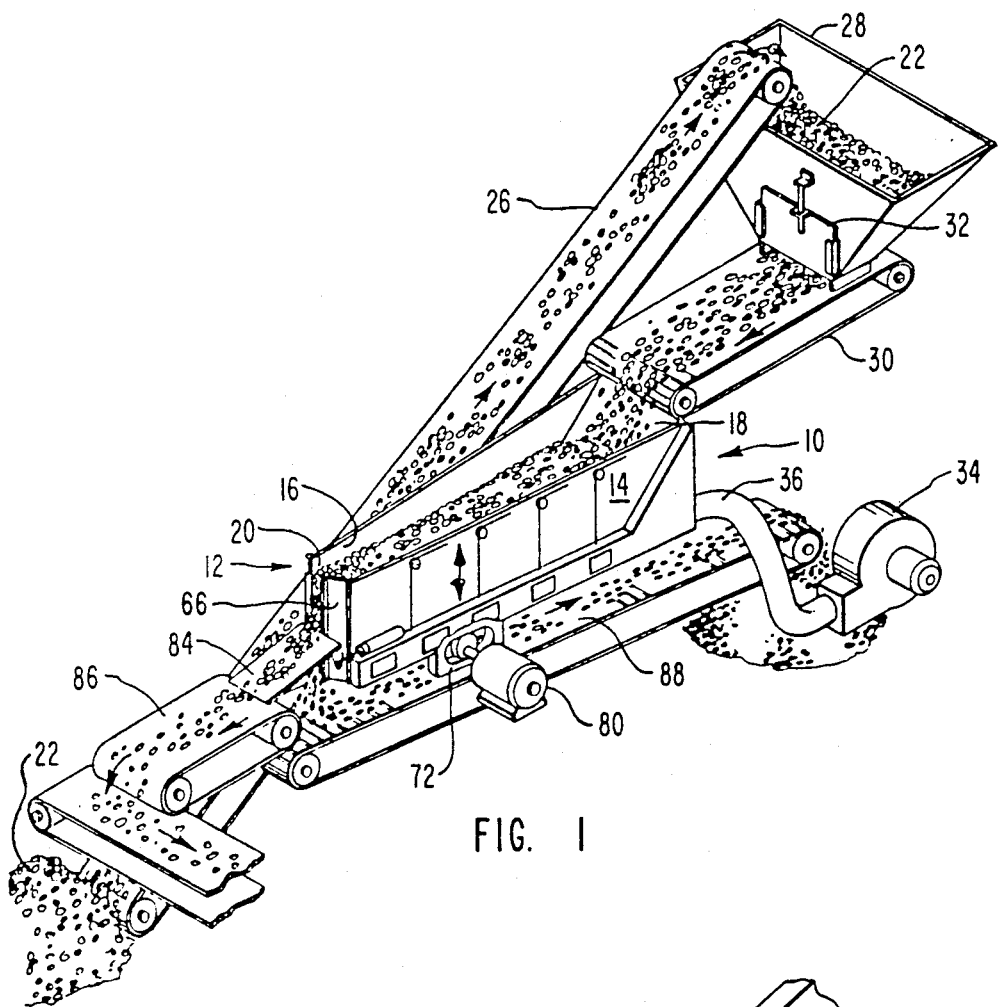
FIG. 1 is a perspective view in schematic form of one embodiment of an apparatus and method incorporating the teachings of the present invention.
Figure 7:
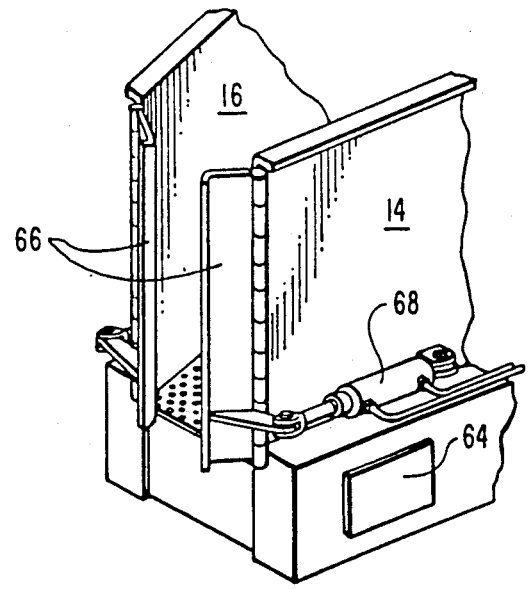
FIG. 7 is an enlarged perspective view of the output end of the trough of FIG. 1.
Figure 2:
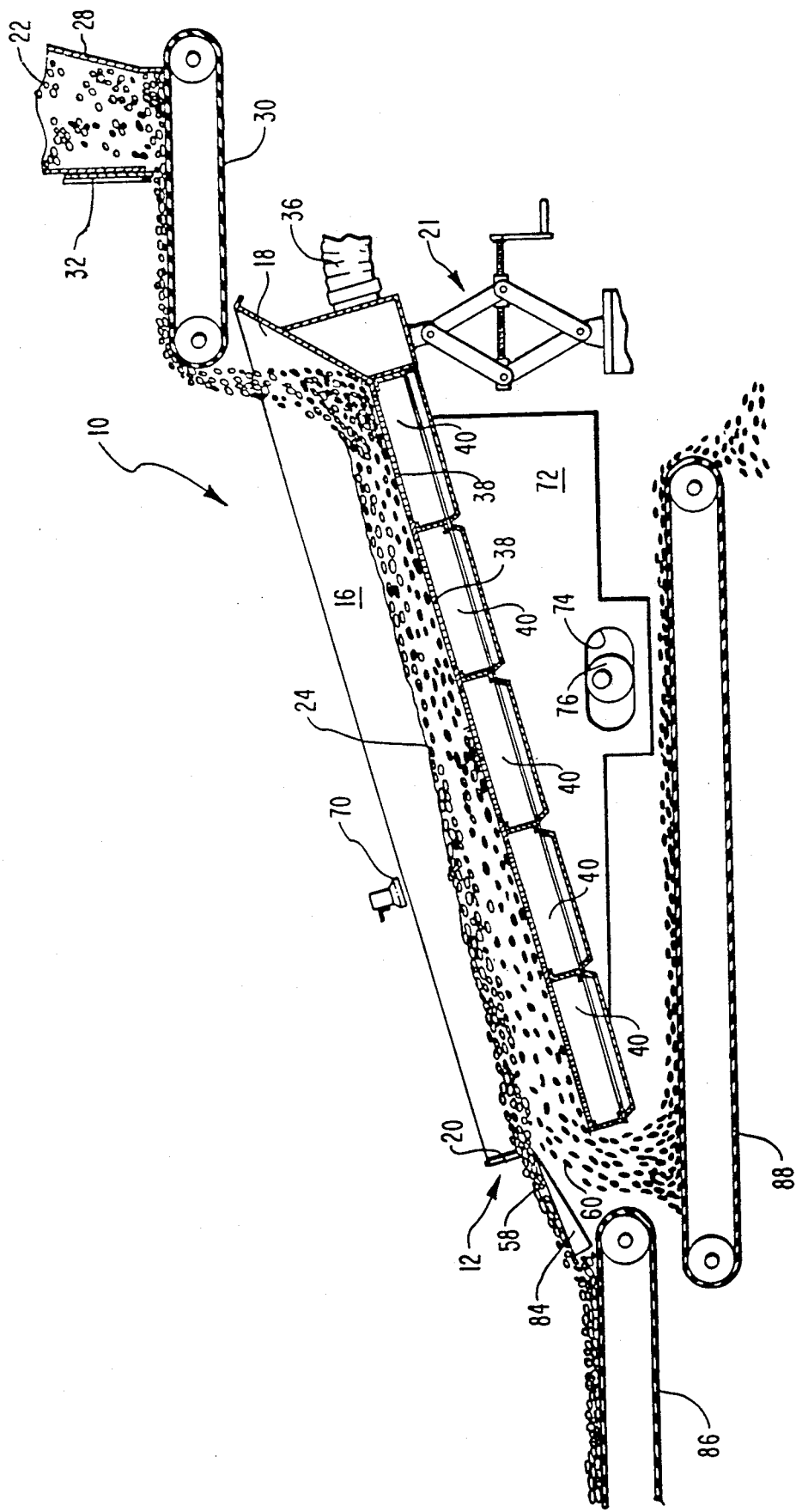
FIG. 2 is a longitudinal cross-sectional view of the apparatus of FIG. 1.

FIGS. 1 and 2 taken together depict one embodiment of a separator 10 incorporating teachings of the present invention. For the sake of simplicity, supporting structure, such as frames, braces, and adjustment mechanisms for the functional components of separator 10 have been largely eliminated in FIG. 1 and FIG. 2. Also, deleted totally from the figures are power sources and drive mechanisms for the several conveyors shown, these being adequate to the purposes of the present invention if of a conventional nature.

In accordance with one aspect of the present invention, separator 10 includes a channelization means having input and output ends for containing a material fluidized bed flowing under the influence of gravity from the input to the output end thereof. As shown by way of example and not limitation, an open trough 12 having upright sidewalls 14, 16 is inclined downwardly from a closed input end 18 to an open output end 20. A mixture of articles 22 is fed into input end 18 of trough 12 and fluidized pneumatically in a manner to be described hereafter to create a fluidized bed 24, shown in FIG. 2.

Due to the incline of trough 12, fluidized bed 24 flows through trough 12 toward output end 20 under the influence of gravity. In order to influence the rate of flow of fluidized bed 24, the steepness of the incline of trough 12 may be rendered adjustable. This may be accomplished by supporting input end 18 of trough 12 on a suitable pivot while output end 20 of trough 12 is in turn upheld by a suitable means for raising and lowering output end 20, such as a scissor jack 21, as shown best in FIG. 2.

Figure 3:
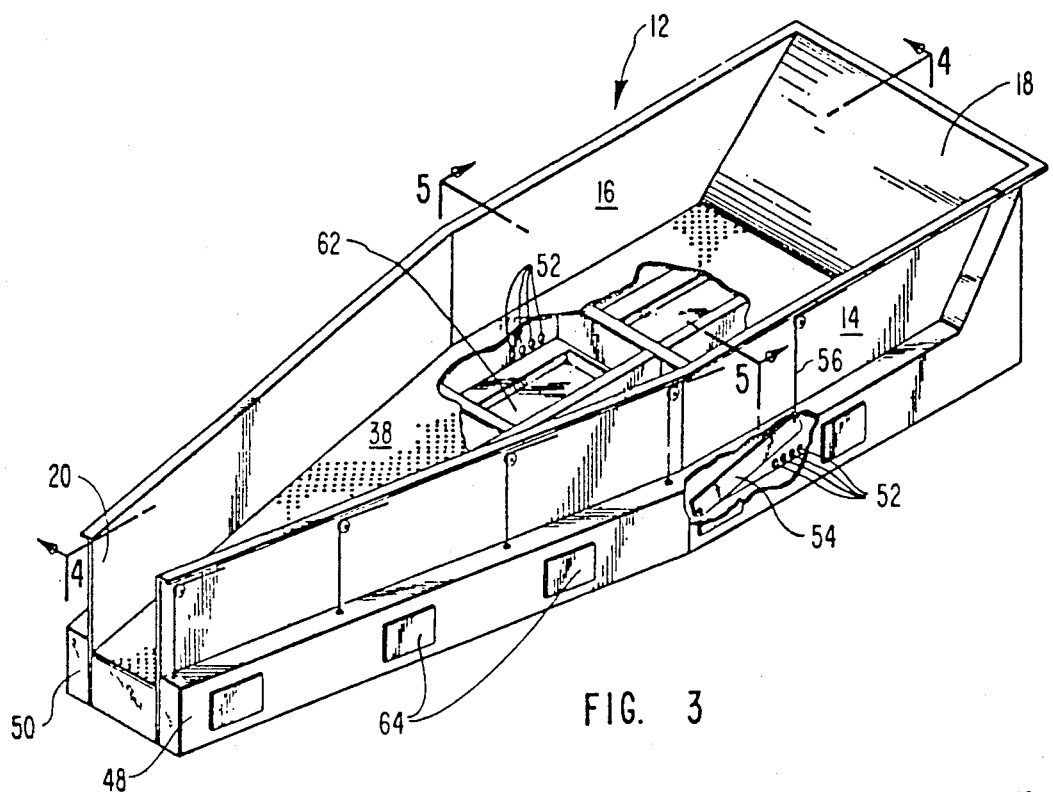
FIG. 3 is a perspective, partial cut-away view of the trough of the separator of FIG. 1.
Figure 4:
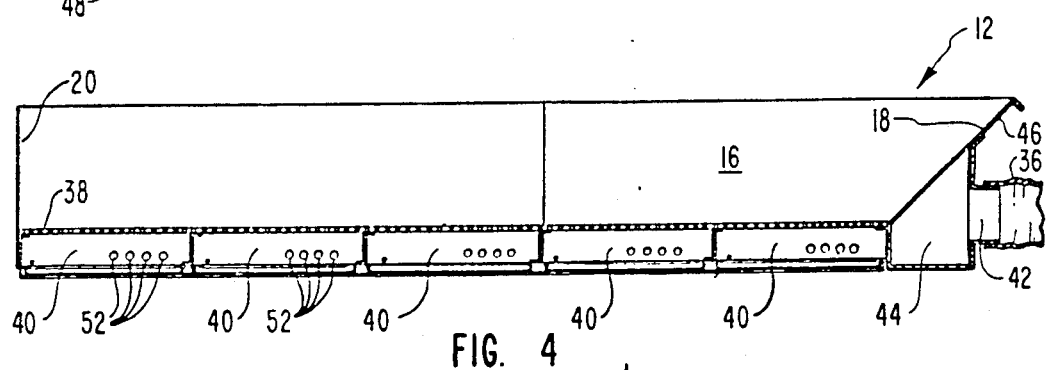
FIG. 4 is a cross-sectional elevation view of the trough at FIG. 3 taken along section line 4—4 shown therein.
Figure 5:
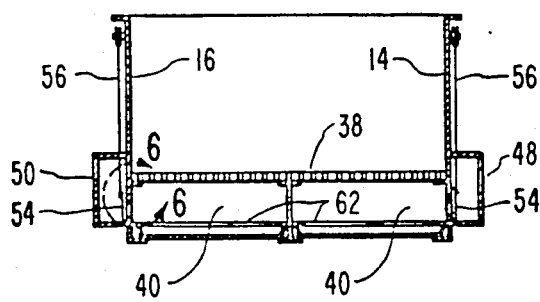
FIG. 5 is a transverse cross-sectional view of the trough of FIG. 3 taken along section line 5—5 shown therein.
Figure 6:
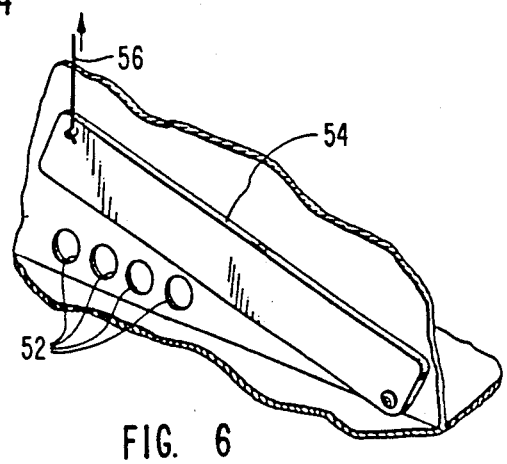
FIG. 6 is an enlarged perspective view of an air control mechanism used in the trough of the separator illustrated in FIG. 1.

As best seen in FIG. 3, the horizontal separation between sidewalls 14, 16 of trough 12 decreases toward output end 20 thereof. As a result, fluidized bed 24 flowing through trough 12 increases in depth along the direction of its flow, advantageously enlarging the distance between the bottom and top thereof. The degree of increase in the depth of fluidized bed 24 at output end 20 of trough 12 is a function of the degree of horizontal separation between sidewalls 14, 16. As a result, it would be appropriate to make sidewalls 14, 16 taller at output end 20 of trough 12 than at input end 18.

Separator 10 is also comprised of a medium feed means for supplying to the input end 18 of trough 12 a fluidization medium from which to create the fluidized bed in the trough. As shown by way of illustration, the medium feed means in the embodiment of FIG. 1 is comprised of a first conveyor 26, a collector bin 28 located at the end of conveyor 26 and a second conveyor 30 which carries the fluidization medium or in the case of the embodiment of FIG. 1 the mixture 22 from bin 28 to the input end 18 of trough 12. The collector bin 28 is provided with an adjustable gate 32 which controls the amount of fluidization medium or mixture 22 introduced onto the conveyor 30. Adjustable gate 32 in combination with conveyor 30 thus serves as a metering means for regulating the rate of supply of fluidization medium to the input end 18 of trough 12.

Separator 10 is also comprised of a pneumatic means for forcing gas upwardly through the fluidization medium in trough 12 to create therefrom a fluidized bed. As already noted, in the case of the embodiment of FIG. 1, the fluidized bed is created from the mixture of articles 22 by directly fluidizing the mixture. The creation of fluidized bed 24 from the mixture 22 through utilization of the pneumatic means is best understood in relation to FIGS. 1-7 taken together.

The bottom of trough 12 comprises an air distribution plate 38 which may be a high density perforated polyethylene plate or porous metal sheet. For the purposes of separator 10, air distribution plate 38 could be designed with an average opening of from 30 microns and a flow rate of 50 standard cubic feet per minute (where particles as fine as sand are fluidized) to 70 microns and a flow rate of 600 standard cubic feet per minute (for particles as large as peanuts). Ambient air is directed through air distribution plate 38 and forced upwardly through the mixture 22 by means of blower 34 and air duct 36.

From air duct 36 air enters a series of chambers 40 (see FIG. 4) below trough 12 and air distribution plate 38 through an orifice 42 of an air receiving chamber 44 beneath inclined end wall 46. The air then divides and passes on either side of trough 12 through rectangular air plenums 48, 50 which extend the full length of trough 12 on opposite sides thereof (see FIGS. 3 and 5). Below air distribution plate 38 the gas pressure chambers 40 each open into one or the other of air plenums 48, 50 through a plurality of circular air intake openings 52. Air under pressure in air plenums 48, 50 thus passes through air intake openings 52 into gas pressure chambers 40 and is forced upwardly through air distribution plate 38 and mixture 22 thereabove to create fluidized bed 24.

Each set of air intake openings 52 is adjustably occludable by a pivoted air pressure control plate 54 (see FIG. 3) which may be raised and lowered by a control cable 56 attached to one end thereof. Ultimately such occlusion impacts the effective density of fluidized bed 24 above each individual air pressure chamber 40. Partially covering intake openings 52 by lowering the pressure control plate 54 reduces the air pressure in the associated air pressure chamber 40 in relation to that existing in air plenums 48, 50. Thus, air intake openings 52 in combination with air pressure control plates 54 serve as air pressure reducing valves for each of air pressure chambers 40.

The narrowing of sidewalls 14, 16 toward the output end 20 of trough 12 causes the depth of fluidized bed 24 to increase in the direction of its flow. This is desirable for efficient separation of mixture 22 into its constituent groups. Increasing the depth of the fluidized bed 24 thus enhances separation by causing better layering, as illustrated at 58 and 60 in FIG. 2.

A shallow fluidized bed requires less air flow to achieve the same effective density than does a deeper one. Decreased air flow in the shallower portions of fluidized bed 24 is therefore utilized. The air pressure in each of air pressure chambers 40 immediately below air distribution plate 38 is individually adjusted toward that end by manipulating air pressure plates 54. The air in air pressure chambers 40 is thereby graduated so that the pressure of the air in each decreases corresponding to the distance of each air pressure chamber 40 along distribution plate 38 from output end 18 of trough 12. This adjustment of air pressure is intended to correspond roughly to the variation in the depth of fluidized bed 24 along the length of trough 12.

The lower portion of each gas pressure chamber 40 is provided with a cleanout hatch 62 to facilitate maintenance, while the outer walls of air plenums 48, 50 at each air pressure control plate 54 are provided with access hatches 64 (FIG. 3) to permit servicing of the pneumatic system at those locations.

It has been found that for some combinations of proportions (e.g., narrowing of the trough, length etc.) and for some degrees of inclinations of a channelization means, such as trough 12, the establishment of an adequately deep fluidized bed 24 does not occur. Thus, in accordance with the present invention a fluidized bed separator, such as separator 10, is provided with restriction means for assisting the establishment of fluidized bed 24 by temporarily retarding the flow of fluidized bed 24 at output end 20 of trough 12 without substantially changing the volume of trough 12.

As shown herein by way of example and not limitation an obstruction is provided which is selectively interposable into the flow of fluidized bed 24 at output end 20 of trough 12. In one embodiment of the restriction means of the present invention shown in FIGS. 1 and 7, such an obstruction takes the form of a plurality of damper plates, or a damper plate or plates that are vertically movable, such as plates 66. Damper plates 66 are pivotable about a vertical axis and actuable, for example, by hydraulic or electrical controls 68. In another embodiment the restriction means take the form of damper 123 of FIG. 10.

The additional resistance to the outflow of fluidized bed 24 from output end 20 of trough 12 causes fluidized bed 24 to rise. Once an acceptable depth is achieved, damper plates 66 are pivoted to mitigate or eliminate totally such restriction to flow. It is also important that damper plates 66 not be extensive enough to completely close off output end 20 of trough 12.

Once established, it is desirable to maintain fluidized bed 24 at an essentially constant depth. This stability, however, is repeatedly disrupted through the addition to fluidized bed 24 of mixture 22 from mixture conveyor 30. In accordance with the present invention, control means are thus provided for sensing the depth of fluidized bed 24 and based thereon for controlling the rate at which conveyor 30 and gate 32 supply mixture 22 to input end 18 of trough 12. In this manner the depth of fluidized bed 24 can be maintained automatically at a preselected value. As shown by way of example and not limitation, one form of such a control means can take the form of an ultrasonic sensor 70 (FIG. 2) mounted above trough 12 to detect the distance of the top surface of fluidized bed 24 therefrom. Cylindrical ultrasonic proximity sensors, such as those among the Series PCU Ultrasonic Proximity Sensors marketed by Agastat Corporation, will function adequately for this purpose. Signals from ultrasonic sensor 70 then are used to control the drive means employed in relation to feed conveyor 30 and/or gate 32.

In accordance with another aspect of the present invention, separator 10 also comprises a vertical oscillation means for imparting to trough 12 a vertical oscillatory movement of selected frequency and amplitude. As shown best in FIGS. 1, 2 and 8 taken together, and as illustrated by way of example and not limitation, the vertical oscillation means may comprise a slotted, wedge-shaped support member 72 (see FIG. 2) which is attached to the bottom of and which supports the trough 12. Support member 72 is provided with a slot 74 which, as hereinafter described in further detail, cooperates with a cam and shaft, shown best in FIG. 8, to impart the described vertical oscillatory motion to the trough 12.

Figure 8:
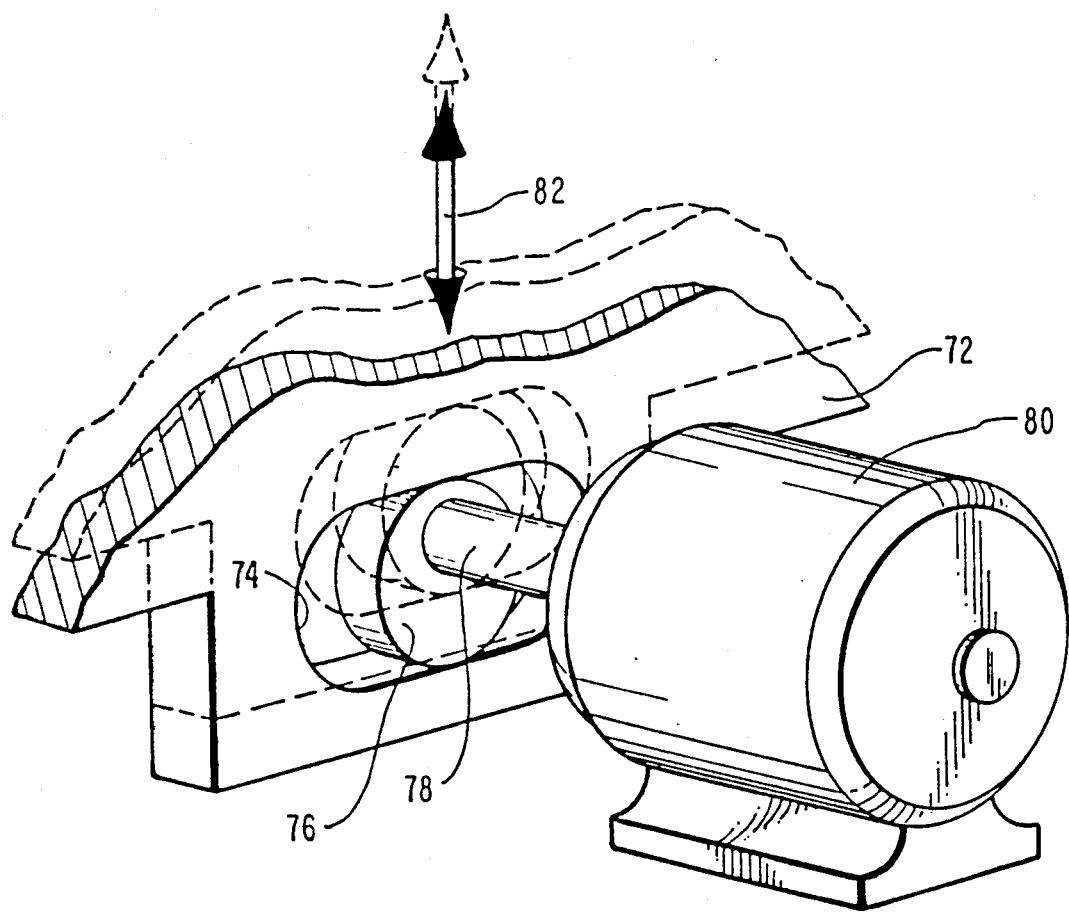
FIG. 8 is an enlarged perspective view of a portion of the inclined trough of FIG. 1 which more particularly illustrates the apparatus and method for imparting vertical oscillatory motion to the inclined trough.

The manner in which the cam member 76 and shaft 78 impart the vertical oscillatory motion is schematically indicated in FIG. 8 by the dashed line representation and is schematically illustrated by the arrow 82. As shown best in FIG. 8, a drive means such as an electric motor 80 drives shaft 78 which in turn is connected to a cam member 76 situated in the slot 74. The length of the slot 74 is such that as the shaft 78 rotates the off-centered cam member 76, the length of the opening of slot 74 is designed so that practically no horizontal component of motion is imparted to the support member 72. On the other hand the off-centered shaft 78 and cam member 76 will impart an up and down or vertical oscillatory motion to the support member 72. Other instruments and combinations for providing the described vertical oscillatory motion may also be devised and are intended to be within the scope of the apparatus and method of the invention, as further illustrated and described for example in connection with FIG. 9.

Importantly, the vertical oscillatory motion substantially improves the separation of mixture 22 as it is fluidized so that improved layering results and hence improved separation at the output end of trough 12. It is important to note that essentially only vertical oscillatory motion is imparted to the trough 12, and there is no attempt to cause the articles of the mixture to move horizontally but only vertically. Horizontal movement is intended to be effected solely by the influence of gravity the mixture 22 is fluidized and flows down the inclined trough 12.

In accordance with the presently understood best mode of the invention, it has been found that the frequency of vibration and amplitude for sorting purposes should preferably be selected such that the articles of mixture 22 will be subjected to from 3 to 12 g (approximately 29-118 m/s$^2$) depending upon the characteristics and size of the product being sorted. Importantly, the improved fluidization which results from such vertical oscillatory motion which is imparted to trough 12 permits material fluidized bed processes to be utilized with products which are substantially larger than 1 to 2 mm, such as peanuts, beans and corn and other similar kinds of larger articles requiring sorting based on small density differences for purposes of rating quality, ripeness or other such characteristics of such products.

The operation of the fluidized bed 24 to separate the articles of mixture 22 is best understood in relation to FIG. 2. The mixture of articles 22 is supplied on conveyor 30 to the input end 18 of trough 12 as described above. The mixture 22 is then fluidized by means of air which, as previously described, is forced through the air plenums 48 and 50 and through the air chambers 40 and gas distribution plate 38 with the air pressures progressively increasing in the chambers 40 as the fluidized bed deepens as it approaches the output end 20 of trough 12. As the mixture 22 is fluidized and flows down the trough under the influence of gravity, a vertical oscillatory motion is also imparted to the trough 12 by means of the wedge-shaped support member 72 and the cam member 76 as previously described in conjunction with FIGS. 1 and 8. As noted above, the vertical oscillation substantially aids in separation and layering of the articles of mixture 22 as the fluidized bed 24 is formed and flows through trough 12 so that articles 58 which are of lesser density form a separate layer from articles having a greater density, such as illustrated for example at 60. A stream splitter 84 in conjunction with conveyors 86 and 88 serve to form a means for off-loading the different layers 58 and 60 which are vertically separated at the output end of the inclined trough 12.

Figure 9:
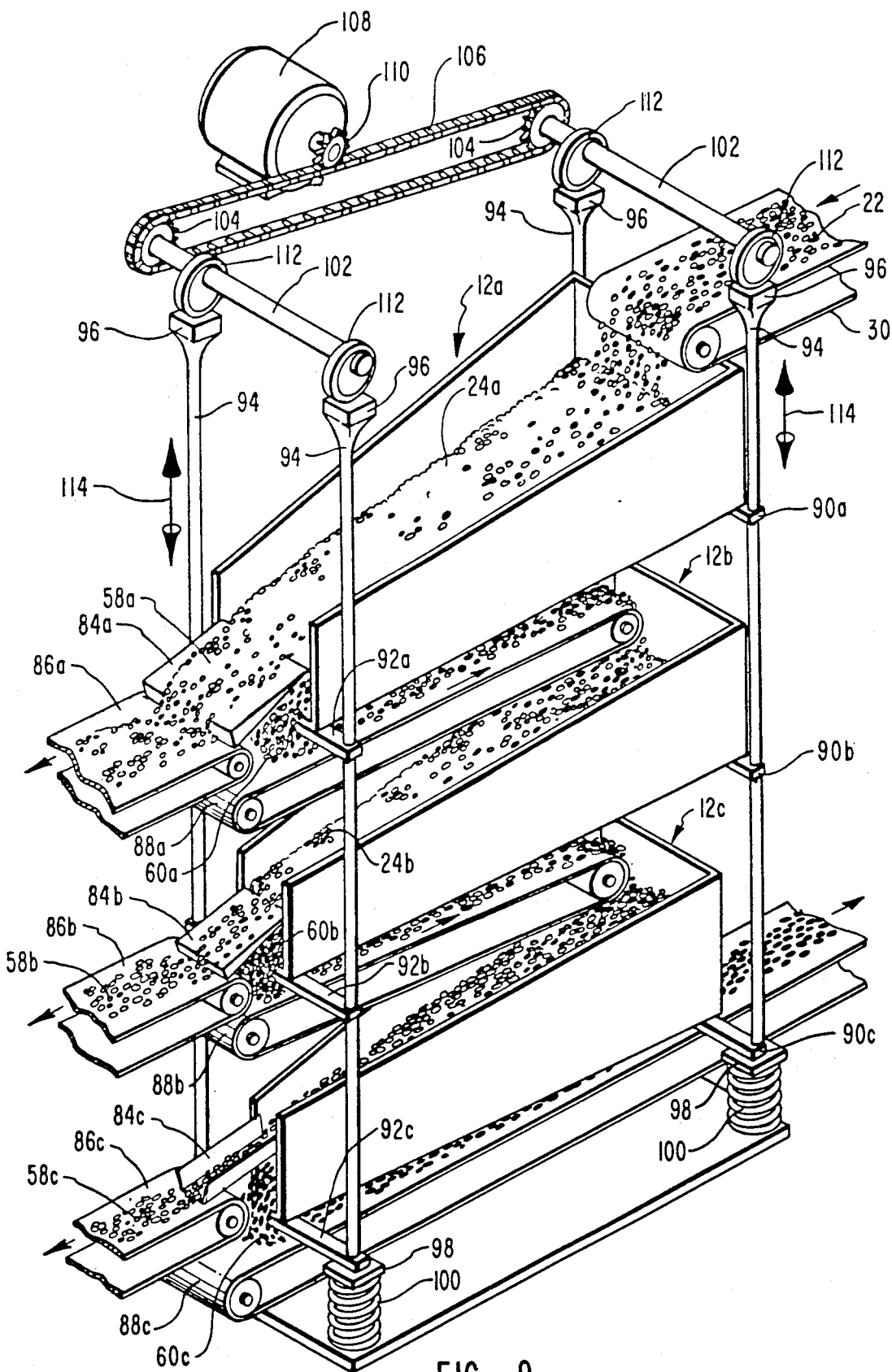
FIG. 9 is a perspective view illustrated in a schematic format which illustrates use of a plurality of separators which are each vertically oscillated and which are used for consecutive fluidization and further separation of a portion of the mixture of articles which is fluidized to effect further separation of one or more layers of the articles contained in the mixture.

FIG. 9 schematically illustrates a further embodiment which incorporates the teachings of the apparatus and method of the present invention to effect further separation of a mixture of articles from which a fluidized bed is formed by taking a portion of the separated articles and processing that portion consecutively through a plurality of troughs. As shown in FIG. 9, three inclined troughs generally designated at 12A-12C are stacked one above the other. For ease of illustration, each of the inclined troughs 12A-12C have been schematically represented and do not show the pneumatic means and the other detail as previously described in conjunction with the trough 12 of FIGS. 1-7, but it is to be understood that each of the troughs 12A-12C would typically comprise the additional detail and structure as described in connection with trough 12 in the embodiment of FIG. 1.

Each of the three inclined troughs 12A-12C are provided with horizontal support members 90A-90C and 92A-92C at the input and output ends of each trough. Support members 90A-90C are preferably provided with a means for adjusting the angle of inclination of each trough 12A-12C, such as a scissors jack (see FIG. 1). Alternatively, support members 90A-90C could themselves be adjustable on rods 94. Thus, in some cases it may be desireable to have different angles of inclination for each trough 12A-12C. The troughs 12A-12C could also be arranged horizontally as opposed to vertically, and such is also intended to be within the scope of the invention.

Attached to each horizontal support member 90 and 92 are vertical rods 94 which are provided with platform-like members 96 and 98 at the top and bottom of each rod 94. The platform 98 which is positioned at the bottom of each rod 94 is situated on a spring 100 whereas the top platform 96 is in contact with a cam member 112 which in turn is rotated by a shaft 102. Each shaft 102 is driven by a chain 106 and sprockets 104 positioned on the ends of shafts 102 so that as the motor 108 drives sprocket 110 the chain 106 is driven, in turn driving the shaft sprockets 104 and shafts 102. The rotational movement of each cam member 112 will in turn impart a vertical oscillatory movement of selected amplitude and frequency as schematically represented by arrows 114 to each of the inclined troughs 12A-12C, and as noted previously.

In the operation of the apparatus and method as illustrated in FIG. 9, the mixture of articles 22 is input from conveyor 30 to the input end of the upper trough 12A and is fluidized in the manner previously described to form a fluidized bed 24A. At the output end of trough 12A the fluidized bed 24A is layered so that articles 58A of lesser density will be separated and can thus be off-loaded by means of the stream splitter 84A and corresponding conveyor 86A, whereas the articles having a greater density such as illustrated at 60A will be off-loaded onto conveyor 88A. Conveyor 88A in turn will introduce that portion of the mixture of articles into the input end of trough 12B so as to form fluidized bed 24B in order to effect a further separation at the output end of trough 12B. A still further separation may be employed if desired by returning a further portion of the mixture of articles by means of conveyor 88B to the input end of trough 12C.

Alternatively, in some cases it will be desireable to subject the layer of less dense articles 58a and 58b for further separation, as in the case of separating peanuts contaminated by flotoxin. Accordingly, consecutive processing of either portion of the mixture (e.g., layers 58 or 60) is intended to be within the scope of the invention.

As will be appreciated from the above description, vertical oscillatory motion of the same selected frequency and amplitude is imparted to each of the troughs 12A-12C so as to advantageously improve the layering and hence separation which occurs at the output end of the respective troughs 12A-12C. Accordingly, at the output end of the lower-most trough 12C, virtually complete separation between the articles of different density, as illustrated 58C and 60C, will have been accomplished by means of the recirculation of a portion of the mixture of articles from one trough to the other.

Figure 10:
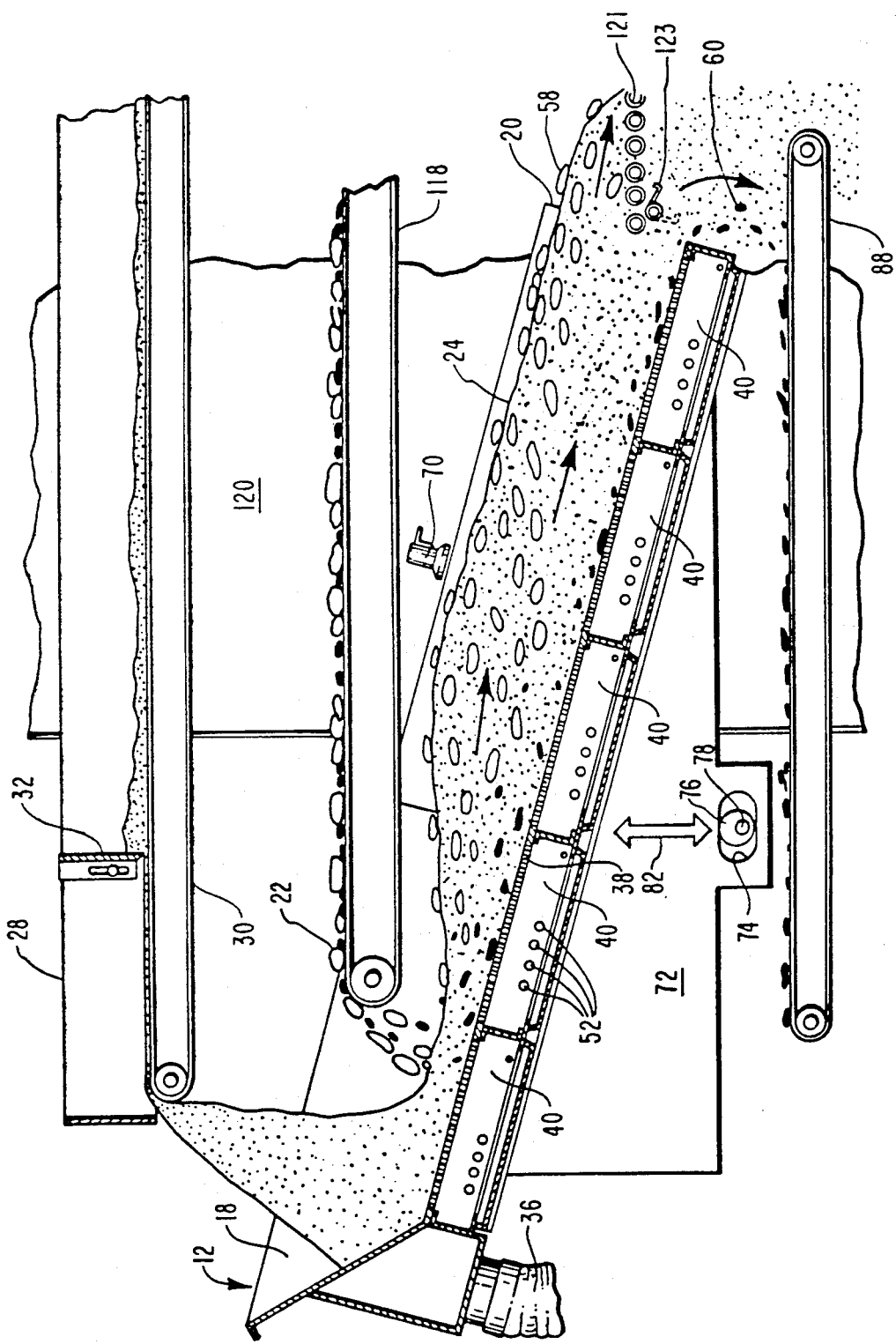
FIG. 10 is a longitudinal sectional view which schematically illustrates another apparatus and method which represents a second embodiment incorporating the teachings of the present invention as applied in connection with fluidized bed medium separation processes.

The embodiment which is schematically illustrated in FIG. 10 includes an inclined trough which is identical to the trough 12 described in connection with the embodiment of FIG. 1 in virtually all respects, including but not limited to the described pneumatic means and the vertical oscillation means. However, rather than utilizing the mixture 22 for purposes of fluidization from which to form the fluidized bed 24, sand or other fine material is input from the medium feed conveyor 30. The medium or sand is then fluidized in the same manner as described in connection with FIG. 1, and the mixture of articles 22 is introduced to the input end 18 of trough 12 so that the articles become entrained in the fluidized bed medium 24 so as to form, for example, float and sink fractions 58 and 60 which are separated by a stream splitter in the form of rollers 121 at the output end 20 of trough 12. The mixture of articles 22 is input from a mixture feed means which may comprise, for example, a separate conveyor 118. A fluidization medium recirculation means is also preferably included, and may comprise, for example, a large drum 120 as schematically illustrated in FIG. 10 and as illustrated and described in further detail in U.S. Pat. No. 4,865,722 incorporated herein by reference.

Significantly, the vertical oscillatory movement which is imparted to the inclined trough 12 of FIG. 10 serves to improve the density uniformity of the fluidized bed medium 24. The improved density uniformity of the fluidized bed 24 permits more effective separation of the articles of different density 58, 60 and permits articles having smaller density differences to be effectively sorted using fluidized bed medium (FBM) processes.

Figure 11:
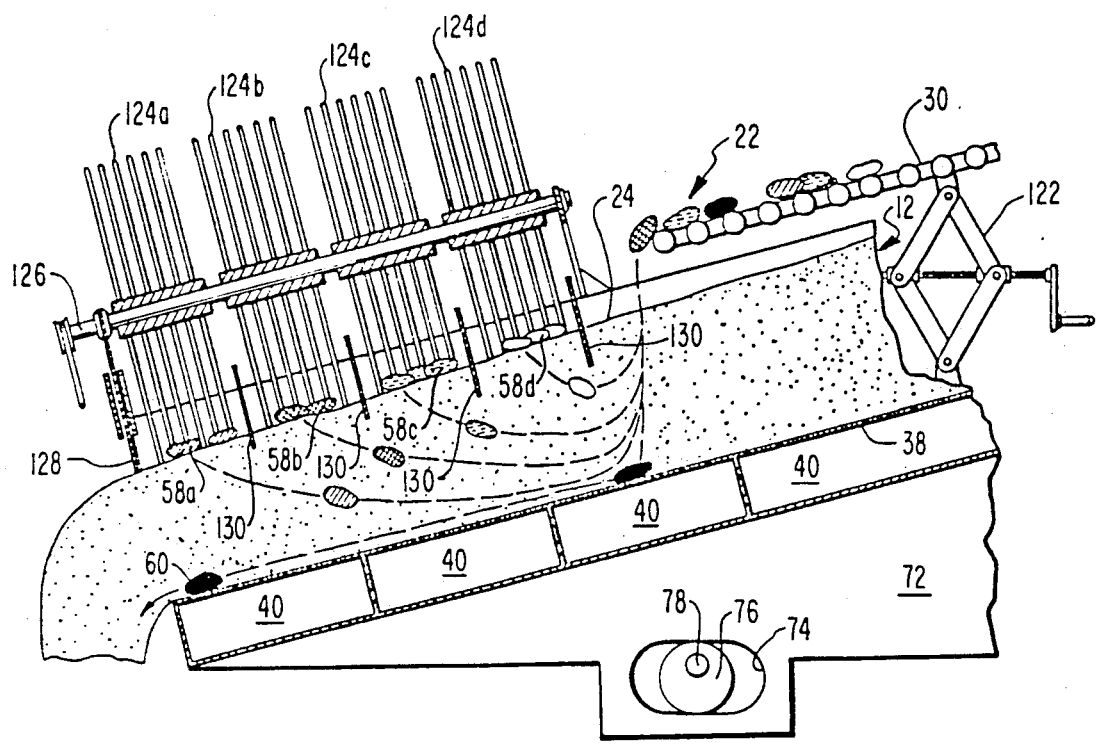
FIG. 11 is a longitudinal sectional view schematically illustrating an apparatus and method which represents yet another embodiment which incorporates the teachings of the present invention.
Figure 12:
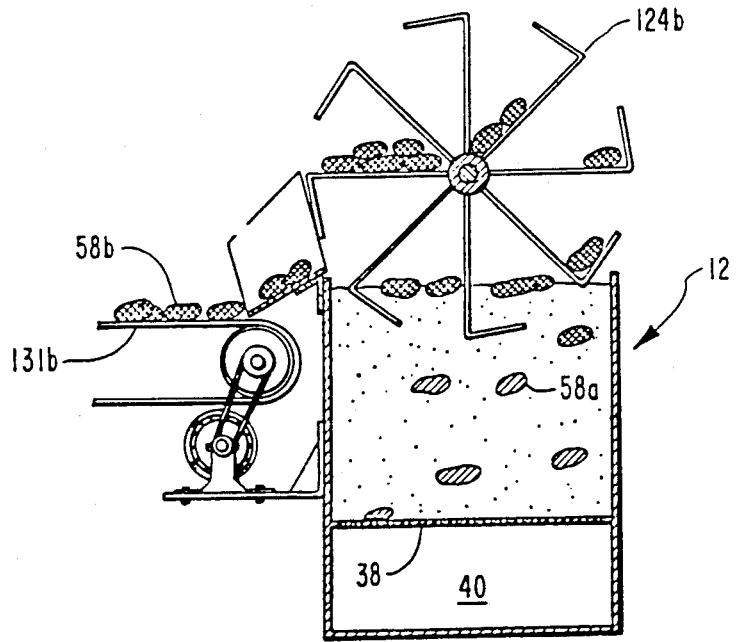
FIG. 12 is a transverse cross-sectional view of the apparatus at FIG. 11 more particularly illustrating the method for removing and off-loading articles which are spatially separated and collected at the top of the fluidized bed medium.

A further illustration of the manner in which the apparatus and method of the present invention may be incorporated into yet another type of fluidized bed medium process is illustrated in FIGS. 11 and 12, taken together. In those figures, once again the inclined trough 12 is essentially identical in connection with the structure of the trough 12 and the pneumatic means and also the means for imparting vertical oscillation to the trough 12. However, in the embodiment shown in those figures, the fluidized bed medium or sand or other fine material which forms the fluidized bed 24 is used as a flotation stream, as illustrated and described in connection with my copending U.S. patent application Ser. No. 373,067, incorporated herein by reference. Accordingly, the mixture of articles 22 is introduced into the flotation stream that is formed by the fluidized bed medium 24 at a selected depth so that the articles become entrained in the flotation stream thereby permitting the articles to separate into different density groups as they ascend to the top of the flotation stream or as they sink to the bottom, as illustrated for example by different density groups 58A-58D which become spatially separated and are collected at the top of the flotation stream, as opposed to the group of articles 60 which sink to the bottom of the flotation stream. Baffles 130 may be placed at the top of the trough 12 to assist in grouping the different density articles and spaced tines 124A-124D (see also FIG. 12) may be used to off-load each different group of articles 58A-58D from the top of the flotation stream for placement onto conveyors, as illustrated for example in FIG. 12 at 131B.

The degree of spatial separation may be controlled by either increasing the angle of incline of the trough 12 so as to increase the rate of flow of the flotation stream, or by controlling the rate of flow of the flotation stream by means of the adjustable gate 128 or also by adjusting the height of conveyor 30 by means of scissor jack 122 so as to adjust the depth at which the articles are introduced into the flotation stream. As will be appreciated, articles having lesser density will ascend more quickly than those which have a greater density thereby effecting spacial separation of the articles at the surface of the flotation stream, and the degree of spatial separation will be affected, as indicated above, by how fast the flotation stream is flowing and also by the depth at which the articles are introduced into the flotation stream.

As in the case of the embodiment described in connection with FIG. 10, the wedge-shaped slotted support member 72 which is used in conjunction with the cam 76 and shaft 78 to impart vertical oscillation to the trough 12 results in improved density uniformity of the flotation stream with the same attendant advantages as described above in connection with FIG. 10.

In summary, the present invention provides an improved method and apparatus for efficiently separating and sorting a mixture of articles, as for example agricultural products, when the articles are to be sorted into several different groups based on small density differences. The described apparatus and method for providing a fluidized bed may be used in connection with material fluidized bed (FB) or fluidized bed medium (FBM) processes to effect improved sorting of articles based on small density differences using either process. In the case of fluidized bed medium sorting processes, the fluidized bed medium is improved with respect to density uniformity whereas in the case of material fluidized bed processes improved layerization and separation of the bed itself is achieved and the size of the articles which are sorted using the improved FB process of the present invention may be significantly larger than 1-2 mm.

The present invention may be embodied in other specific forms without departing from its spirit or essential characteristics and the described embodiments are therefore to be considered in all respects only as illustrative and not restrictive. The scope of the invention is, accordingly, indicated by the appended claims rather than by the foregoing description, and all changes which come within the meaning and range of equivalency of the claims are to be embraced within their scope.

What is claimed is:

1. An apparatus for providing a fluidized bed to effect a separation of a mixture of articles having at least a first density and a second density that is greater than the first density into separate groups, the apparatus comprising:

an inclined channelization means having input and output ends and otherwise enclosed along the length of the sides and bottom thereof so as to form a continuous channel for containing a fluidized bed flowing under the influence of gravity from said input end to said output end;

medium feed means for supplying to said input end of said channelization means a fluidization medium from which to create the fluidized bed in said channelization means;

pneumatic means for forcing gas upwardly through said fluidization medium in said channelization means to create from said fluidization medium a fluidized bed; and vertical oscillation means for uniformly imparting to said entire inclined channelization means essentially only a vertical oscillatory movement of selected frequency so that there is no significant horizontal movement imparted to said fluidized bed.

2. An apparatus as defined in claim 1 wherein said fluidization medium is comprised of said mixture of articles, and wherein said apparatus further comprises a means for off-loading different layers of said mixture which are vertically separated at said output end of said channelization means.

3. An apparatus as defined in claim 2 further comprising a plurality of said channelization means each having a corresponding pneumatic means, vertical oscillation means, and means for off-loading, and further comprising a means for returning at least a portion of said mixture exiting from an output end of one of said channelization means to the input end of another of said channelization means such that said portion of said mixture is further fluidized by said plurality of channelization means to effect further separation.

4. An apparatus as defined in claim 3 wherein each said channelization means is laterally narrower at said output end than at said input end to progressively increase the depth of said fluidized bed in the direction of flow through each said channelization means.

5. An apparatus as defined in claim 4 wherein said pneumatic means comprises:
(a) a pressurized gas source;
(b) a perforated gas distribution plate supporting said fluidization medium in said channelization means; and
(c) a gas distribution plenum beneath said gas distribution plate communicating with said pressurized gas source to direct gas therefrom through said gas distribution plate.

6. An apparatus as defined in claim 5 wherein said gas plenum comprises:
(a) a plurality of distinct gas pressure chambers communicating with said pressurized gas source and arrayed adjacent one to another below said gas distribution plate along the length thereof to direct gas from said pressurized gas source through successive adjacent transverse portions of said gas distribution plate; and
(b) a plurality of individually controllable valves, each of said valves being located between a corresponding one of said gas pressure chambers and said pressurized gas source for adjusting individually the pressure of the gas in each of said gas pressure chambers to maintain said density of said fluidized bed uniform throughout said channelization means.

7. An apparatus as defined in claim 5 wherein said gas distribution plate comprises a porous sheet having a high resistance to the passage of gas therethrough.

8. An apparatus as defined in claim 2 further comprising a metering means for regulating the rate of supply of said fluidization medium to said input end of said channelization means.

9. An apparatus as defined in claim 2 wherein said channelization means comprises a trough inclined downwardly from said input end to said output end of said channelization means, said trough being provided with side walls horizontally spaced closer together at said output end of said channelization means than at said input end thereof.

10. An apparatus as defined in claim 9 wherein said side walls have a greater height at said output end of said channelization means than at said input end thereof.

11. An apparatus as defined in claim 9 further comprising means for adjusting the angle of incline of said channelization means.

12. An apparatus as defined in claim 2 further comprising restriction means for assisting the establishment of the fluidized bed by temporarily retarding the flow of the fluidized bed at said output end of said channelization means without substantially changing the volume of said channelization means.

13. An apparatus as defined in claim 12 further comprising control means for sensing the depth of the fluidized bed and in relation thereto for controlling the rate at which said medium feed means supplies fluidization medium to said input end of said channelization means, whereby to maintain said depth of the fluidized bed at a predetermined value.

14. An apparatus as defined in claim 1 further comprising mixture feed means for supplying the mixture of articles to said input end of said channelization means for entrainment in the fluidization bed throughout the length thereof, whereby separation of the articles of said mixture into different density groups is effected as said fluidized bed and the entrained mixture flow through said channelization means.

15. An apparatus as defined in claim 14 wherein said pneumatic means comprises:
(a) a pressurized gas source;
(b) a perforated gas distribution plate supporting said fluidization medium in said channelization means; and
(c) a gas distribution plenum beneath said gas distribution plate communicating with said pressurized gas source to direct gas therefrom through said gas distribution plate.

16. An apparatus as defined in claim 15 wherein said gas plenum comprises:
(a) a plurality of distinct gas pressure chambers communicating with said pressurized gas source and arrayed adjacent one to another below said gas distribution plate along the length thereof to direct gas from said pressurized gas source through successive adjacent transverse portions of said gas distribution plate; and
(b) a plurality of individually controllable valves, each of said valves being located between a corresponding one of said gas pressure chambers and said pressurized gas source for adjusting individually the pressure of the gas in each of said gas pressure chambers to maintain said density of said fluidized bed uniform throughout said channelization means.

17. An apparatus as defined in claim 15 wherein said gas distribution plate comprises a porous sheet having a high resistance to the passage of gas therethrough.

18. An apparatus as defined in claim 14 further comprising a metering means for regulating the rate of supply of said fluidization medium to said input end of said channelization means.

19. An apparatus as defined in claim 14 wherein said channelization means comprises a trough inclined downwardly from said input end to said output end of said channelization means, said trough being provided with side walls horizontally spaced closer together at said output end of said channelization means than at said input end thereof.

20. An apparatus as defined in claim 19 wherein said side walls have a greater height at said output end of said channelization means than at said input end thereof.

21. An apparatus as defined in claim 19 further comprising means for adjusting the angle of incline of said channelization means.

22. An apparatus as defined in claim 14 further comprising restriction means for assisting the establishment of the fluidized bed by temporarily retarding the flow of the fluidized bed at said output end of said channelization means without substantially changing the volume of said channelization means.

23. An apparatus as defined in claim 22 further comprising control means for sensing the depth of the fluidized bed and in relation thereto for controlling the rate at which said medium feed means supplies fluidization medium to said input end of said channelization means, whereby to maintain said depth of the fluidized bed at a predetermined value.

24. An apparatus as defined in claim 14 wherein said mixture feed means comprises means for introducing said mixture of articles into said fluidized bed at a selected depth so as to cause said articles to ascend to the top of said bed as said articles are flowing with said bed, thereby effecting a spatial separation of said mixture into groups of different density as said articles reach the top of said bed.

25. An apparatus as defined in claim 24 further comprising discharge means, positioned along the length of said channelization means, for separate removal of each group formed at the top of said bed.

26. An apparatus as defined in claim 14 further comprising medium recirculation means for collecting fluidization medium at the output end of said channelization means and returning the collected fluidization medium to the medium feed means for input of said fluidization medium back into the input end of said channelization means.

27. An apparatus as defined in claim 1 wherein said vertical oscillation means comprises a slotted member attached to said channelization means, and a camshaft means for rotation in conjunction with said slotted member so as to impart a vertical oscillation of said slotted member.

28. An apparatus as defined in claim 1 wherein said vertical oscillation means comprises vertically moveable rod means attached to said channelization means for imparting vertical motion thereto, and camshaft means for rotation in conjunction with said rod means so as to impart a vertical oscillation to said rod means.

29. An apparatus for providing a fluidized bed to effect a separation of a mixture of articles having at least a first density and a second density that is greater than the first density into separate groups, the apparatus comprising:
a plurality of inclined channelization means each having input and output ends and otherwise enclosed along the length of the sides and bottom thereof so as to form a continuous channel for containing a fluidized bed flowing under the influence of gravity from said input end to said output end;

medium feed means for supplying to the input end of at least one said channelization means a fluidization medium comprising of said mixture from which to create the fluidized bed in said channelization means;

pneumatic means for forcing gas upwardly through said fluidization medium in said channelization means to create from said fluidization medium a fluidized bed;

vertical oscillation means for uniformly imparting to each entire said inclined channelization means essentially only a vertical oscillatory movement of selected frequency with no significant horizontal movement so as to create within said fluidized bed a plurality of separate layers each containing articles of different density;

means for returning at least one said layer of said mixture exiting from an output end of at least one said channelization means to the input end of another of said channelization means; and means for off-loading different layers of said mixture which are vertically separated at the output end of each channelization means.

30. An apparatus as defined in claim 29 wherein each said channelization means is laterally narrower at said output end than at said input end to progressively increase the depth of said fluidized bed in the direction of flow through each said channelization means.

31. An apparatus as defined in claim 29 wherein said pneumatic means comprises:
(a) a pressurized gas source;
(b) a perforated gas distribution plate supporting said fluidization medium in said channelization means; and
(c) a gas distribution plenum beneath said gas distribution plate communicating with said pressurized gas source to direct gas therefrom through said gas distribution plate.

32. An apparatus as defined in claim 31 wherein said gas plenum comprises:
(a) a plurality of distinct gas pressure chambers communicating with said pressurized gas source and arrayed adjacent one to another below said gas distribution plate along the length thereof to direct gas from said pressurized gas source through successive adjacent transverse portions of said gas distribution plate; and
(b) a plurality of individually controllable valves, each of said valves being located between a corresponding one of said gas pressure chambers and said pressurized gas source for adjusting individually the pressure of the gas in each of said gas pressure chambers to maintain said density of said fluidized bed uniform throughout said channelization means.

33. An apparatus as defined in claim 31 wherein said gas distribution plate comprises a porous sheet having a high resistance to the passage of gas therethrough.

34. An apparatus as defined in claim 29 wherein each said channelization means comprises a trough inclined downwardly from said input end to said output end of said channelization means, said trough being provided with side walls horizontally spaced closer together at said output end of said channelization means than at said input end thereof.

35. An apparatus as defined in claim 34 further comprising means for adjusting the angle of incline of said channelization means.

36. An apparatus as defined in claim 34 wherein said side walls have a greater height at said output end of said channelization means than at said input end thereof.

37. An apparatus as defined in claim 29 wherein each channelization means comprises restriction means for assisting the establishment of the fluidized bed by temporarily retarding the flow of the fluidized bed at said output end of said channelization means without substantially changing the volume of said channelization means.

38. An apparatus as defined in claim 37 wherein each channelization means comprises control means for sensing the depth of the fluidized bed and in relation thereto for controlling the rate at which said medium feed means supplies fluidization medium to said input end of said channelization means, whereby to maintain said depth of the fluidized bed at a predetermined value.

39. A method of providing a fluidized bed to effect a separation of a mixture of articles having at least a first density and a second density that is greater than the first density into separate groups, comprising the steps of:

supplying to an inclined trough having inlet and outlet ends a fluidization medium from which to produce a fluidized bed flowing uninterrupted under the influence of gravity through the length of said trough;

forcing air upwardly through said fluidization medium in said trough to produce therefrom the fluidized bed; and uniformly imparting to said entire trough essentially only a vertical oscillatory movement of selected frequency with no significant horizontal movement imparted to the fluidized bed.

40. A method as defined in claim 39 wherein said fluidization medium is comprises of said mixture of articles, and wherein said method further comprises the step of off-loading different layers of said mixture which are vertically separated at said output end of said trough.

41. A method as defined in claim 40 further comprising the step of returning at least a portion of said mixture exiting from said trough to at least one further trough such that said portion of the mixture is fluidized by said further trough to effect further separation.

42. A method as defined in claims 40 or 41 further comprising the step of progressively increasing the depth of said fluidized bed in the direction of flow through said trough.

43. A method as defined in claim 39 further comprising the step of supplying said mixture of articles to said input of said trough for entrainment in the fluidized bed, whereby separation of the articles of said mixture into different density groups is effected as the fluidized bed and the entrained mixture flow through said trough.

44. A method as defined in claim 43 wherein said step of supplying said mixture of articles comprises the step of introducing said mixture of articles into said fluidized bed at a selected depth so as to cause said articles to ascend to the top of said bed as said articles are flowing with said bed, thereby effecting a spatial separation of said mixture into groups of different density as said articles reach the top of said bed.

45. A method as defined in claim 44 further comprising the step of removing each group formed at the top of said bed.

46. A method as defined in claim 43 further comprising the steps of collecting said fluidization medium at the output of said trough and returning the fluidization medium to the input of said trough.

47. A method as defined in claim 43 further comprising the step of temporarily retarding the flow of the fluidized bed without substantially changing the volume of said trough until the fluidized bed has been established.

48. A method as defined in claim 43 further comprising the step of progressively increasing the depth of said fluidized bed in the direction of flow through each said trough.

49. A method as defined in claim 48 further comprising the step of adjusting the pressure of said gas forced through said fluidization medium along the length of said trough.

50. A method as defined in claim 39 further comprising the step of adjusting the angle of incline of said trough.

* * * * *

UNITED STATES PATENT AND TRADEMARK OFFICE
CERTIFICATE OF CORRECTION

PATENT NO. : 5,118,409

DATED : June 2, 1992

INVENTOR(S) : ARTHUR ZALTZMAN

It is certified that error appears in the above-identified patent and that said Letters Patent is hereby corrected as shown below:

```
On the title page,
Abstract, line 1, "ABSTRACT" should be --ABSTRACT OF THE DISCLOSURE--
Column 10, line 20, "desireable" should be --desirable--
Column 10, line 59, "desireable" should be --desirable--
Column 11, line 6, after "illustrated" insert --at--
Column 12, line 15, "spacial" should be --spatial--
Column 16, line 3, delete "of"
Column 17, line 37, "comprises" should be --comprised--
```

Signed and Sealed this

Twelfth Day of October, 1993

Attest:

BRUCE LEHMAN

*Attesting Officer*    *Commissioner of Patents and Trademarks*